US008775463B2

(12) United States Patent
Wong et al.

(10) Patent No.: US 8,775,463 B2
(45) Date of Patent: Jul. 8, 2014

(54) DETECTION AND DISPLAY OF SEMANTIC ERRORS IN A REPORTING TOOL

(75) Inventors: Ken C. Wong, Burnaby (CA); Lu Yahui, Burnaby (CA); David Mosimann, New Westminster (CA); Madison Poon, Vancouver (CA); Jonathan Tiu, Delta (CA)

(73) Assignee: Business Objects Software Limited, Dublin (IE)

( * ) Notice: Subject to any disclaimer, the term of this patent is extended or adjusted under 35 U.S.C. 154(b) by 0 days.

(21) Appl. No.: 12/953,505

(22) Filed: Nov. 24, 2010

(65) Prior Publication Data
US 2012/0131040 A1 May 24, 2012

(51) Int. Cl.
*G06F 17/30* (2006.01)
(52) U.S. Cl.
USPC .......................... 707/769; 707/756; 715/223
(58) Field of Classification Search
USPC .................. 707/758, 769, 756; 715/223
See application file for complete search history.

(56) References Cited

U.S. PATENT DOCUMENTS

| | | | | |
|---|---|---|---|---|
| 6,631,402 | B1 | 10/2003 | Devine | |
| 6,742,015 | B1 | 5/2004 | Bowman-Amuah | |
| 7,085,803 | B1 * | 8/2006 | Shisler et al. | 709/201 |
| 7,467,134 | B2 * | 12/2008 | Bayiates | 1/1 |
| 7,620,936 | B2 * | 11/2009 | Ernst et al. | 717/108 |
| 8,103,660 | B2 * | 1/2012 | Hupfer et al. | 707/722 |
| 2003/0115207 | A1 * | 6/2003 | Bowman et al. | 707/100 |
| 2007/0150862 | A1 | 6/2007 | Naibo et al. | |
| 2008/0016086 | A1 | 1/2008 | Chang et al. | |
| 2009/0031206 | A1 * | 1/2009 | Aureglia et al. | 715/217 |
| 2010/0306708 | A1 * | 12/2010 | Trenz et al. | 715/853 |

FOREIGN PATENT DOCUMENTS

WO     WO 99/15976 A1    4/1999

OTHER PUBLICATIONS

Robin Abraham et al; Visual Specifications of Correct Spreadsheets; Proceedings of the 2005 IEEE Symposium on Visual Languages and Human-Centric Computing; 8 pages (http://web.engr.oregonstate.edu/~erwig/papers/ViTSL_VLHCC05.pdf).
Takeo Igarashi et al.; Fluid visualization of spreadsheet structures; Proceedings of the IEEE Symposium on Visual Languages 1998; 8 pages (http://www-ui.is.s.u-tokyo.ac.jp/~takeo/papers/vl98.pdf).
Microsoft Corporation; About triangle indicators in cells: Applies to: Microsoft Office Excel 2003; Microsoft Corporation 2010; 1 page (http://office.microsoft.com/en-us/excel-help/about-triangle-indicators-in-cells-HP003089552.aspx?CTT=1).
Microsoft Corporation; Hide error values and error indicators in cells: Applies to: Microsoft Office Excel 2007; Microsoft Corporation 2010; 2 pages (http://office.microsoft.com/en-us/excel-help/hide-error-values-and-error-indicators-in-cells-HP010070515.aspx?CTT=1).

(Continued)

Primary Examiner — Cam Truong

(57) ABSTRACT

Various embodiments of systems and methods for providing a semantic guidance in a report are described herein. A mismatch is identified between a report object positioned at a location on the report and the area with which the location is associated. The mismatch is identified based on the metadata of the report object and the attribute of the area with which the location is associated. In one embodiment, the identified mismatch is displayed to a user in a tooltip. In one embodiment, if an attribute of an area of the report is changed, the mismatch is identified between the report object present in the area and the changed attribute.

23 Claims, 13 Drawing Sheets

(56) References Cited

OTHER PUBLICATIONS

Richard Brath et al; Spreadsheet Validation and Analysis through Content Visualization; Proc. European Spreadsheet Risks Int. Grp. (EuSpRIG) 2006 pp. 175-183 (http://arxiv.org/ftp/arxiv/papers/0803/0803.0166.pdf).

European Search Report for EP Application No. 11007625.4, mailed on Nov. 7, 2011; 9 pages.

Shuai Hu et al; Pattern-Directed Reporting Tool With Two Phase Outputs; Proceedings of IEEE International Conference on Software Engineering and Service Sciences (ICSESS), 2010; 6 pages; (http://ieeexplore.ieee.org/xpl/freeabs_all.jsp?arnumber=5552338).

\* cited by examiner

DETECTION AND DISPLAY OF SEMANTIC ERRORS IN A REPORTING TOOL

FIELD

Embodiments generally relate to computer systems, and more particularly to methods and systems for identifying and displaying a mismatch between a report object and an area of a report with which the report object is associated.

BACKGROUND

Present day reporting tools such as Crystal Reports® by SAP® allow a business user to create reports that can retrieve format and display data from a data source, database, or data warehouse. These report tools allow the business user to easily add report objects to different areas of the report.

However, business users typically are not aware of relationships/rules that may exist and affect the "semantic correctness" of the placement of the report object in specific areas of the report. Also, business users are not typically aware of the properties of the report object modeled in the data source. Placing the report object in the area of the report without understanding these relationships and properties may lead to the placement of the report object that may be technically "correct" but semantically "incorrect".

Therefore a method that provides guidance to the business user when there is a mismatch between the report object and the area is desired.

SUMMARY

Various embodiments of systems and methods for detection and display of semantic errors in a reporting tool are described herein. Metadata of a report object associated with an area of the report is retrieved. The area of the report has an attribute related to the area. A mismatch is identified between the report object and the area based on the metadata and the attribute.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for detection and display of semantic errors in a reporting tool are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
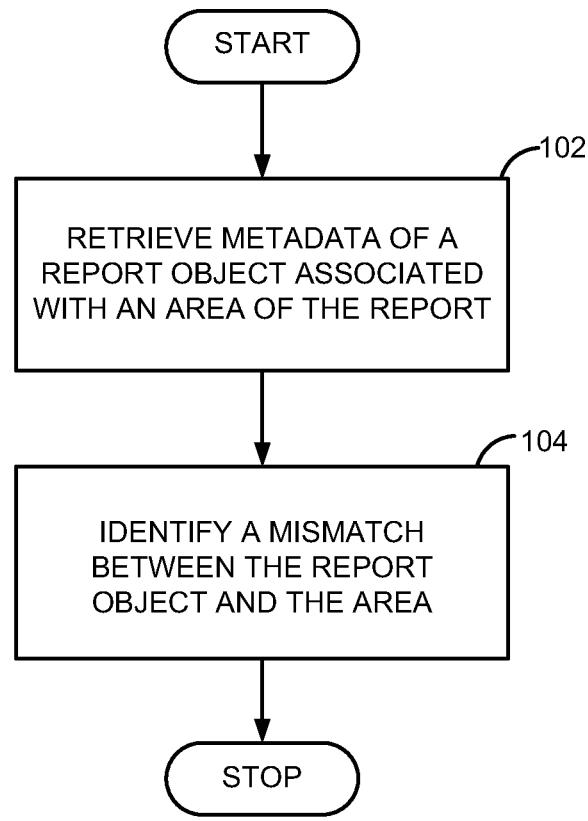
FIG. 1 is a flow diagram illustrating a method for providing semantic guidance in a report, according to an embodiment.

FIG. 1 is a flow diagram illustrating a method for providing semantic guidance in a report, according to an embodiment. In one embodiment, the report has an area. In one embodiment, the area of the report is one of: a report header/footer pair area, a page header/footer pair area, a group header/footer pair area, and a detailed area. In some embodiments a header or footer is unmatched. In one embodiment, the report is a business intelligence (BI) application such as a Crystal Report® or SAP® BusinessObjects™ Web Intelligence® report.

Initially at block 102, metadata of a report object associated with the area of the report is retrieved. In one embodiment, the metadata includes information about the report object. For example, the metadata of the report object may include information that the report object has one data value or more than one data value, or the report object is flat or hierarchical, or the report object is an aggregate. In one embodiment, the metadata for the report object is retrieved from a data source or a web service that stores the report object and the metadata associated with the report object.

In one embodiment, the report object associated with the area of the report is positioned in the area of the report. In one embodiment, the report object associated with the area of the report is present in the area of the report.

The area of the report has an attribute. In one embodiment, the attribute of the report refers to one or more properties specific to the area. For example, the attribute of the report header/footer pair area could be that it can accept a report object having only a single value. In one embodiment, an attribute can be used to calculate a mismatch between a report object and an area in a report. The mismatch could be an efficiency in report processing, a semantic relationship, and the like. The attribute is metadata used in the creation and processing of the report, or metadata designed to identify semantic errors.

Next at block 104, a mismatch is identified between the report object and the area of the report. The mismatch is identified based on the metadata of the report object retrieved in block 102 and the attribute of the area with which the report object is associated.

In one embodiment, the mismatch is identified between the report object newly positioned at a location on the report and the area associated with the location. In another embodiment, the mismatch is identified between the report object already present in the area of the report and the area of the report.

In one embodiment, a set of heuristics are used to identify the mismatch between the report object and the area with which the report object is associated. A few exemplary heuristics are described below. However, other heuristics can be considered as well.

Example 1.1

Identified Mismatch

The report object may have multiple values in the group header/footer area but only the first or last value will be displayed. (Context): This mismatch is identified when a level or an attribute (report object) is within a group header/footer pair area. In one embodiment, an attribute is defined as any non-null value in a data set. In one embodiment, a level is defined as a position in a hierarchy. (Reason): The reason for this mismatch is the level or attribute (report object) has multiple values within the group header/footer pair area.

For example, if a report object "Region" (a level) is positioned on a group header/footer pair area grouped on "Country", "Region" refers to all the regions within the "Country". In case, the report object "Region" is placed in the group header/footer pair area only the first region or the last region of the report object "Region" is displayed.

Example 1.2

Identified Mismatch

The Report Object may have multiple values in the report header but only the first value will be displayed. (Context): This mismatch is identified when a dimension, level, or attribute (report object) is within a report header, unless the report object is used as a summarized field or grouping condition inside a chart or a crosstab. In one embodiment, the dimension is defined as a line in a real or abstract space. (Reason): This mismatch is identified since the report object has multiple values within this context. For example, when referring to the Country level within the report header, Country refers to all the countries within the report. In this case, only the first country will be displayed.

Example 1.3

Identified Mismatch

The report object may have multiple values in the report footer but only the last value will be displayed. (Context): This mismatch is identified when a dimension, level, or attribute (report object) is within a report footer, unless if the report object is used as a summarized field or grouping condition inside a chart or crosstab. (Reason): The reason for this mismatch is that the report object has multiple values within this context. For example, when referring to the Country level within the report footer, Country refers to all the countries within the report. In this case, only the last country will be displayed.

Example 1.4

Identified Mismatch

Only the first value on the page will be shown. (Context): This mismatch is identified when a dimension, level, or attribute is positioned within the page header.

Example 1.5

Identified Mismatch

The measure (report object) has no meaningful value in this location. In one embodiment, the measure is defined as a quantity as ascertained by comparison with a standard, usually denoted in some unit, e.g., units sold, dollars. (Context): This mismatch is identified when the measure is placed in a page header/footer pair area. (Reason): The reason for this mismatch is that there is no aggregation context (in the page header/footer pair area) for the measure (report object) to be based on.

Figure 2:
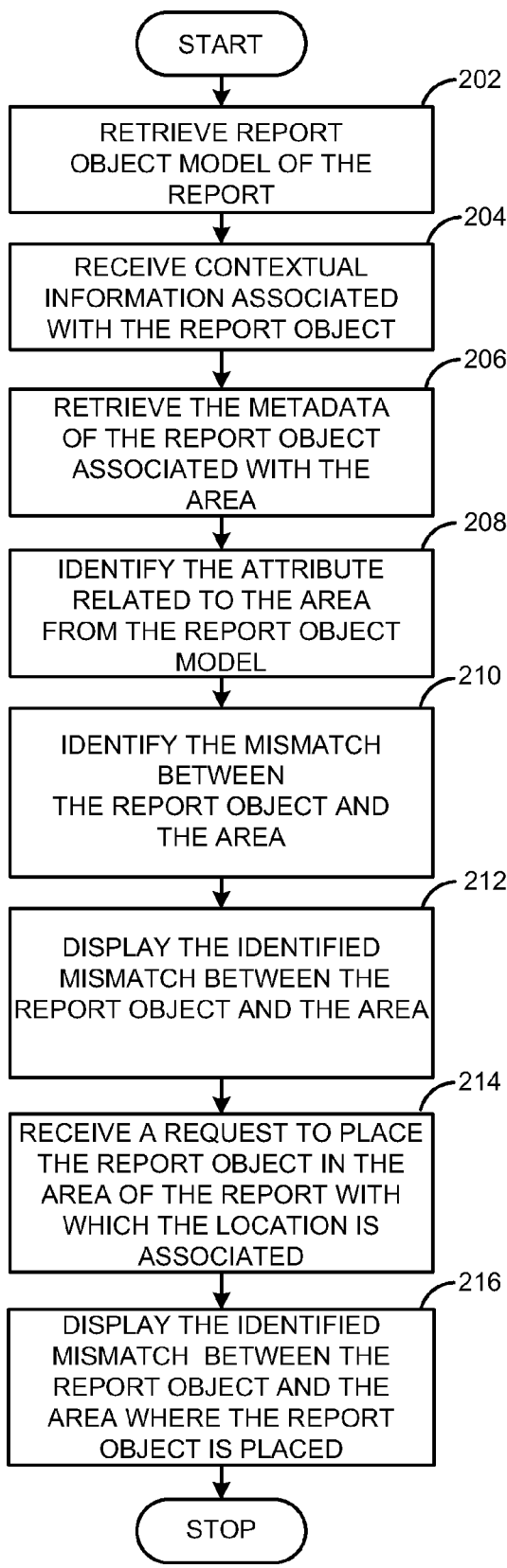
FIG. 2 is a flow diagram illustrating the method for providing semantic guidance in the report when a report object is positioned at a location on the report, according to an embodiment.

FIG. 2 is a flow diagram illustrating a method for providing semantic guidance in the report when the report object is positioned at the location on the report, according to an embodiment. The report may include one or more areas. In one embodiment, the one or more areas of the report are: a report header/footer pair area, a page header/footer pair area, a group header/footer pair area, and a detailed area.

Initially at block 202 a report model of the report is retrieved. In one embodiment, the report model is retrieved when a report is opened in a reporting tool. The report model of the report includes an attribute of the one or more areas of the report. For example, the report model may include the attribute of each of the report header/footer pair area, the page header/footer pair area, the group header/footer pair area, and the detailed area. In one embodiment, the report model is retrieved from the report.

Next at block 204, contextual information associated with the report object is received. The contextual information includes information of a location on the report where the report object is positioned. In one embodiment, the contextual information is received from a user interface via which the report object is positioned at the location on the report. In one embodiment, the report object is positioned at the location on the report using a mouse cursor. In one embodiment, the report object is "dragged" using the mouse cursor directly from the data source or the web service to the location on the report. The location on the report is associated with an area from among the one or more areas of the report. For example, if the location where the report object is positioned is within the group header/footer pair area then the location is associated with the group header/footer pair area.

Next at block 206, the metadata of the report object positioned at the location on the report is retrieved. In one embodiment, block 206 the metadata of the report area is retrieved without reference to the report object.

Next at block 208, the attribute related to the area on which the report object is positioned is identified from the report model. The attribute of the area is identified from the attribute of the one or more areas of the report included in the report model retrieved at block 202. For example, if the report object is placed at the location associated with the group header/footer pair area, the attribute of the group header/footer pair area is identified from the attribute of the one or more areas of the report (report header/footer pair area, page header/footer pair area, group header/footer pair area, and detailed area) included in the report model.

Next at block 210, the mismatch is identified between the report object and the area associated with the location at which the report object is positioned. The mismatch is identified based on the metadata of the report object retrieved at block 206 and the attribute of the area identified at block 208. In one embodiment, the set of heuristics are used for identifying the mismatch. In one embodiment, the mismatch is identified for each location on the report as the report object is dragged over the report. In one embodiment, the dragging occurs some time before the mismatch is identified. For example, the dragging happens and the report is saved, and later after the report is reopened the mismatch is identified. In one embodiment, the dragging is optional. The mismatch is identified after another action, such as, a redo or an undo operation.

Next at block 212, the identified mismatch is displayed. In one embodiment, the identified mismatch is displayed on a user interface. In one embodiment, the identified mismatch is displayed to a user. In one embodiment, the identified mismatch is displayed in a tooltip placed adjacent to the mouse cursor used for positioning the report object at the location on the report. In one embodiment, the output identifying the mismatch is generated but not displayed on a user interface. This output can be displayed latter or not at all. In one embodiment, the method of FIG. 2 ends after block 212.

Next at block 214, a request is received to place the report object at the location where the report object is positioned. In one embodiment, the request is received via a user interface. In one embodiment, the request is received from a user. In one embodiment, the report object is positioned and placed on the report using a drag-and-drop operation.

Finally at block 216, the mismatch, identified at block 210, between the report object and the area is displayed for the report object placed at the location. In one embodiment, the report object placed at the location is ear-marked to indicate the mismatch. If a mouse cursor is positioned on the report object placed in the area, the identified mismatch is displayed in a tooltip.

Figure 3:
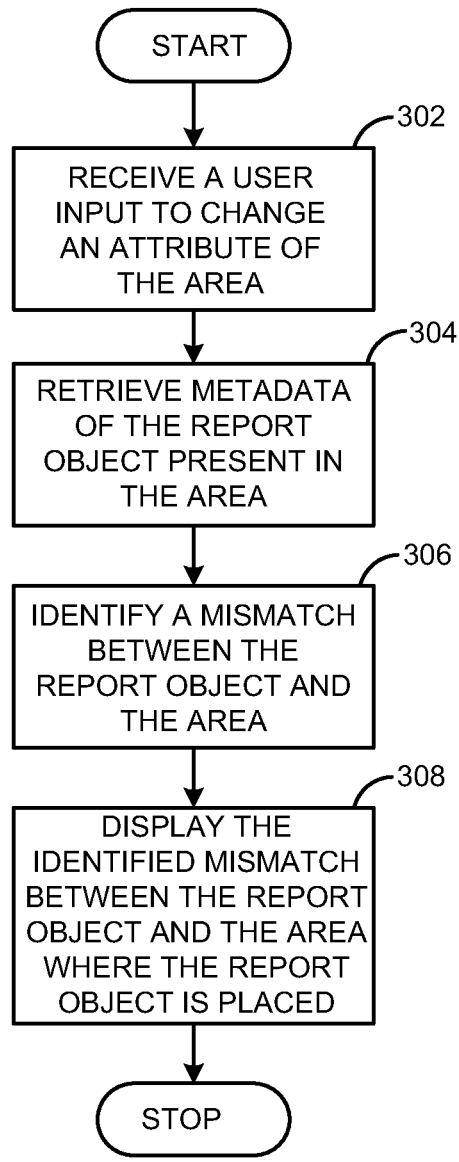
FIG. 3 is a flow diagram illustrating the method for providing semantic guidance in the report when an attribute of an area of the report object is changed, according to an embodiment.

FIG. 3 is a flow diagram illustrating the method for providing semantic guidance in the report when the attribute of the area of the report is changed, according to an embodiment. Initially at block 302, an input is received for changing an attribute of the area of the report. In one embodiment, the input is received from a user via a user interface.

Next at block 304, the metadata of the report object present in the area of the report is retrieved. In one embodiment, the area whose attribute is changed may include more than one report object present in the area. The metadata for each of the one more report objects present in the area is retrieved.

Next at block 306, the mismatch is identified between the report object and the area. The mismatch is identified based on the metadata of the report object retrieved at block 304 and the changed attribute of the area. In case the area includes more than one report object, the mismatch is identified between the area and each report object present in the area. In one embodiment, the mismatch is identified based on the set of heuristics.

Finally at block 308, the identified mismatch is displayed to the user. In one embodiment, the report object is highlighted to indicate the mismatch. In one embodiment, when a mouse cursor is positioned on the highlight, the identified mismatch is displayed in a tooltip positioned adjacent to the mouse cursor.

Figure 4:
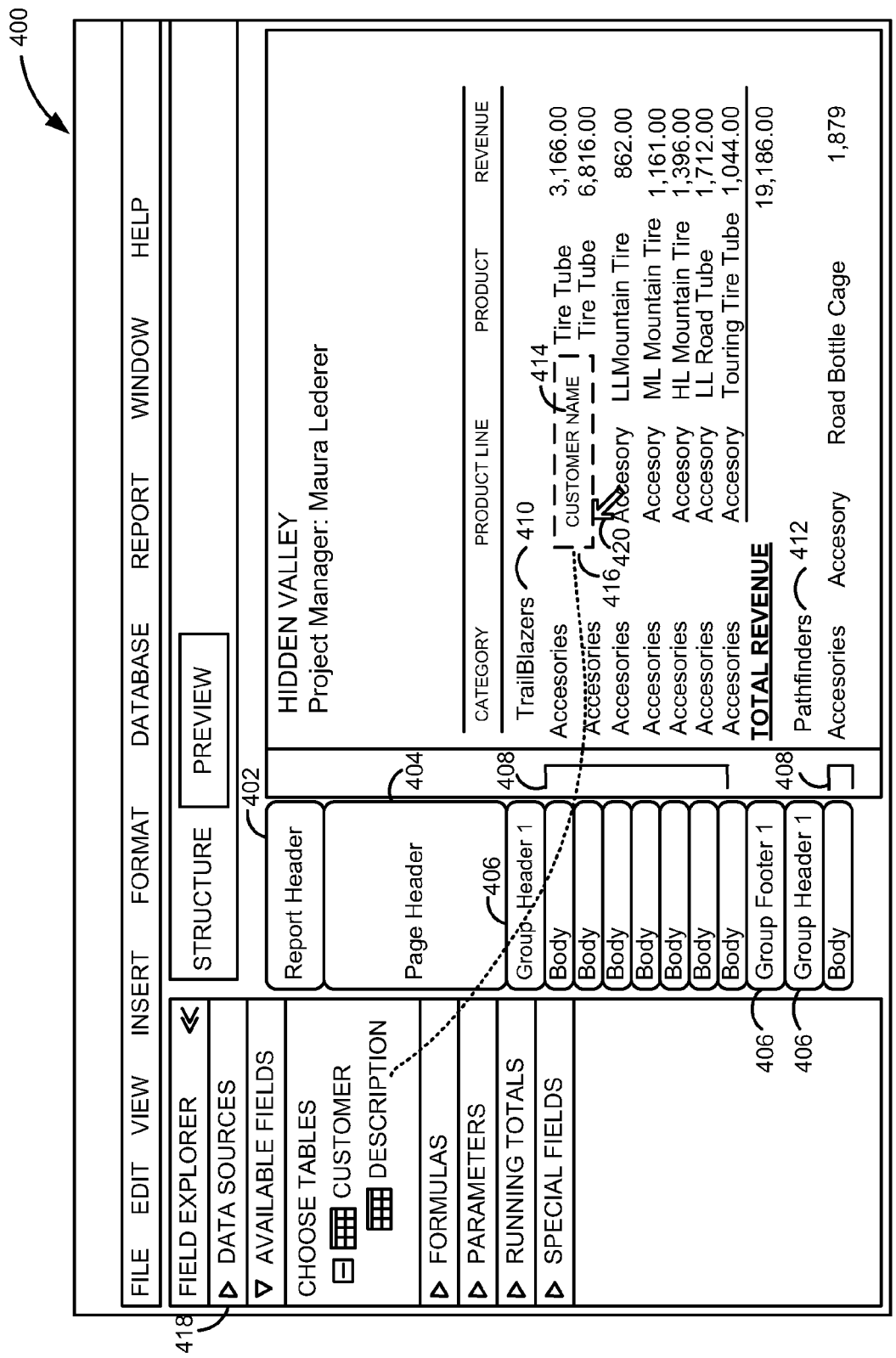
FIG. 4 illustrates an exemplary report, according to an embodiment.

FIG. 4 illustrates an exemplary report, according to an embodiment. The report 400 includes one or more areas. The one or more areas of the report 400 are: a report header/footer pair area 402 (report footer not shown), a page header/footer pair area 404 (page footer not shown), a group header/footer pair area 406, and a detailed area 408 (body)).

The report 400 has a grouping on "Product Category." As shown in the group header/footer pair area 406, one of the product category is TrailBlazer 410 and another product category is Pathfinders 412 (present in the Group Header 1 406).

Initially a report model of the report 400 is retrieved (block 202, FIG. 2). The report model of the report 400 includes the attribute of the one or more areas of the report, i.e., the attribute of the report header/footer pair area 402, the page header/footer pair area 404, the group header/footer pair area 406, and the detailed area 408. The attribute of the report header/footer pair area 402, the page header/footer pair area 404, the group header/footer pair area 406, provide information that these areas can accept a report object having a single data value. The attribute of the detailed area 408 provides information that this area can accept report object having more than one data value.

Next, the contextual information associated with a report object 414 "Customer Name" is received (block 204, FIG. 2). The contextual information of the report object 414 "Customer Name" includes information of a location 416 where the report object 414 "Customer Name" is positioned.

The location 416 of the report 400 is associated with an area of the report 400. As shown, the location 416 is present within the detailed area (body) 408 of the report 400, therefore the location 416 is associated with the detailed area 408 of the report 400. In one embodiment, the report object 414 "Customer Name" is dragged directly from the data source 418 and positioned at the location 416 of the report 400 using a mouse cursor 420.

Next, the metadata of the report object 414 "Customer Name" is retrieved (block 206, FIG. 2). In one embodiment, the metadata of the report object 414 "Customer Name" is retrieved from the report 400. The metadata of the report object 414 "Customer Name" provides information that the report object 414 "Customer Name" is a dimension that has more than one data value.

In one embodiment, a dimension is defined as a line in a real or abstract space. An example of a real space dimension is the line defined by a pair oppositely pointing cardinal points on a compass, e.g., North and South, North-Northwest and South-Southeast. Another real dimension is time. An example of an abstract space dimension is a list of stores. The dimension is abstract because the list can be ordered alphabetically by name, by store number, by distance from head office, etc.

Examples of dimensions include region, store, year, customer, employee, product line, and the like.

Next, the attribute related to the detailed area 408 (associated with the location 416 where the report object 414 "Customer Name" is positioned), is identified from the report model (block 208, FIG. 2). As discussed above, the report model includes attribute of the one or more areas (report header/footer pair area 402, the page header/footer pair area 404, the group header/footer pair area 406, and the detailed area 408) of the report 400. The attribute of the detailed area 408 is identified from this attribute of the one or more areas of the report 400 included in the report model. The attribute of the detailed area 408 provides information that the detailed area 408 can accept a report object having more than one data value.

Next the mismatch is identified between the report object 414 "Customer Name" and the detailed area 408 (associated with the location 416 where the report object 414 "Customer Name" is positioned) (block 210, FIG. 2). The mismatch is identified based on the metadata of the report object 414 and the attribute of the detailed area 408 with which the location 416 is associated. As discussed above, the metadata of the report object 414 "Customer Name" provides information that the report object 414 "Customer Name" has more than one data value. The attribute of the detailed area 408 provides information that the detailed area 408 can accept report object having more than one data value. As the report object 414 "Customer Name" has more than one data value (information obtained from metadata) and the detailed area 408 can accept report object having more than one data value (information obtained from attribute), no mismatch is identified between the report object 414 "Customer Name" and the detailed area 408.

Figure 5:
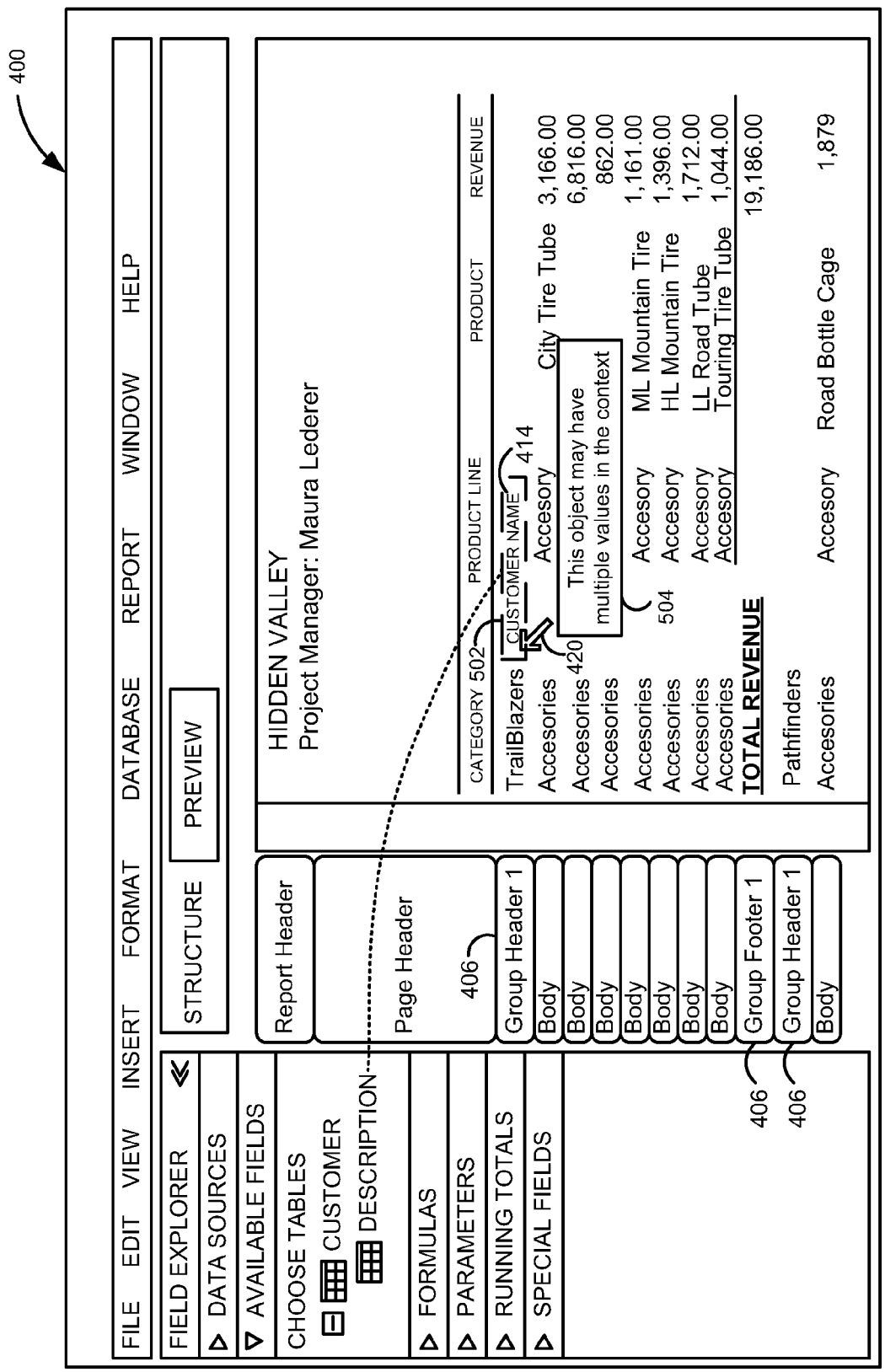
FIG. 5 illustrates the report of FIG. 4 when a report object is positioned at a location associated with a group header/footer pair area of the report, according to an embodiment.

FIG. 5 illustrates the report 400 of FIG. 4 when the report object 414 "Customer Name" is positioned at a location 502 associated with the group header/footer pair area 406 of the report 400, according to an embodiment. As shown, the report object 414 "Customer Name" is positioned at the location 502 of the report 400. The location 502 is associated with the group header/footer pair area 406.

The attribute of the group header/footer pair area 406 is identified from the report model of the report 400. The attribute of the group header/footer pair area 406 provides the following information: the group header/footer pair area 406 can accept a report object having only one data value, the group is grouped on "product category", and the group has a flat hierarchy.

Next, the mismatch is identified between the report object 414 "Customer Name" and the group header/footer pair area 406 (block 210, FIG. 2). The mismatch is identified based on the metadata of the report object 414 "Customer Name" and the attribute of the group header/footer pair area 406. As discussed above, the metadata of the report object 414 "Customer Name" provides information that the report object 414 "Customer Name" has more than one data value. The attribute of the group header/footer pair area 406 provides information that the area can accept report objects having a single data value. As the report object 414 "Customer Name" has more than one data value (information obtained from metadata) and the group header/footer pair area 406 can accept a report object having only one data value (information obtained from attribute), the mismatch is identified between the group header/footer pair area 406 and the report object 414 "Customer Name". The identified mismatch is "This object may have multiple values in this context".

In one embodiment, the set of heuristics are used for identifying the mismatch between the report object 414 "Customer Name" and the group header/footer pair area 406. The heuristic for identifying the mismatch would be: (Identified Mismatch) Report Object has multiple values in the report header; only first value will be displayed. (Context) This mismatch is identified when a dimension, level, or attribute (report object) is within a group header. (Reason): The report object has multiple values within this context.

Next, the identified mismatch between the report object 414 "Customer Name" and the group header/footer pair area 406 is displayed (block 212, FIG. 2). As shown, the identified mismatch is displayed in a tooltip 504 placed adjacent the cursor 420. As shown, the mismatch displayed in the tooltip 504 is "This object may have multiple values in this context." The displayed mismatch provides the semantic guidance to the user that the report object 414 "Customer Name" should not be placed in the group header/footer pair area 406.

Next, a request is received to place the report object 414 "Customer Name" at the location 502 in the group header/footer pair area 408 (block 214, FIG. 2). In one embodiment, a user may ignore the identified mismatch displayed in the tooltip 504 and request to place the report object 414 at the location 502. In one embodiment, the report object 414 "Customer Name" is positioned and placed at the location 502 of the report 400 by the drag-and-drop operation using the mouse cursor 420.

Figure 6:
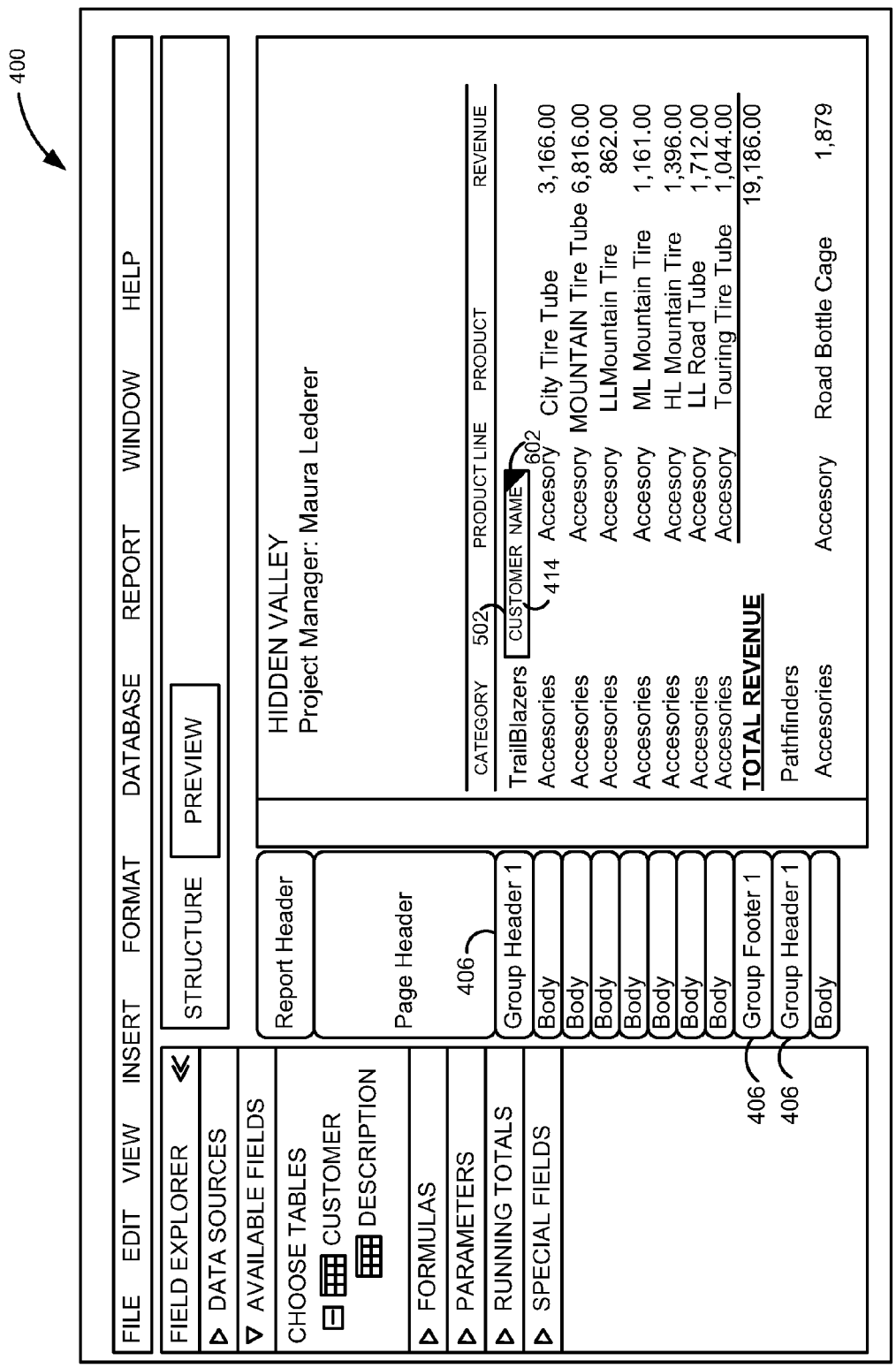
FIG. 6 illustrates the report of FIG. 4 when the report object is placed at the location of the report, according to an embodiment.

FIG. 6 illustrates the report 400 of FIG. 4 in which the report object 414 "Customer Name" is placed at the location 502 of the report 400, according to an embodiment. As the report object 414 "Customer Name" and the group header/footer pair area 406 (with which the location 502 is associated) are "mismatched" the report object 414 "Customer Name" is marked with a sash 602. The sash 602 is indicative of the mismatch between the report object 414 "Customer Name" and the group header/footer pair area 406.

Finally, the identified mismatch between the report object 414 "Customer Name" and the group header/footer pair area 406 is displayed (block 216, FIG. 2).

Figure 7:
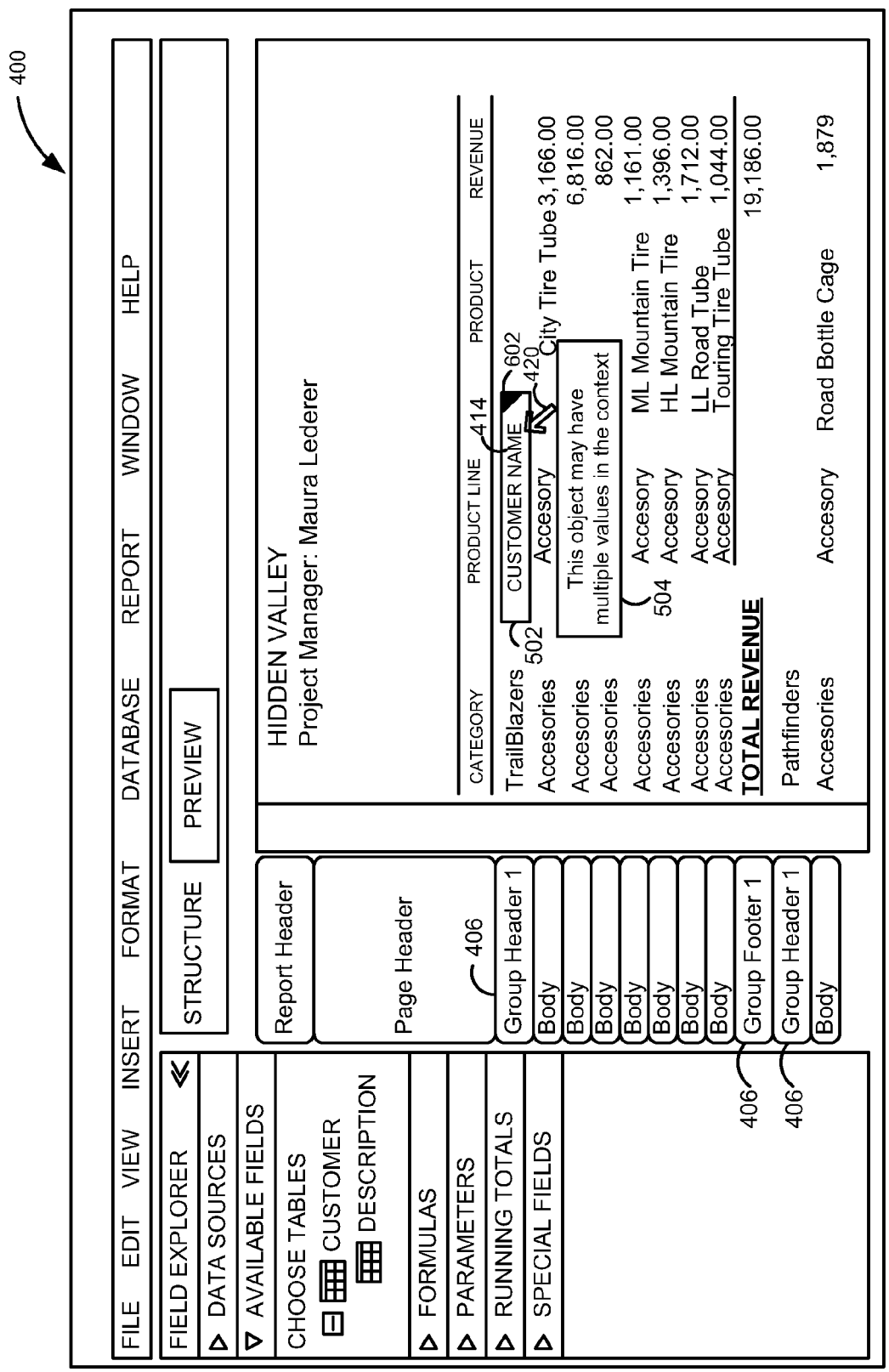
FIG. 7 illustrates the display of the identified mismatch when the report object is placed at the location of the report of FIG. 4, according to an embodiment.

FIG. 7 illustrates the display of identified mismatch when the report object 414 "Customer Name" is placed at the location 502 of the report 400 of FIG. 4, according to an embodiment. As shown in FIG. 7, when the cursor 420 is positioned on the report object 414 the tooltip 504 present adjacent to the cursor 420 displays the identified mismatch. The identified mismatch displayed is "This object may have multiple values in this context".

Figure 8:
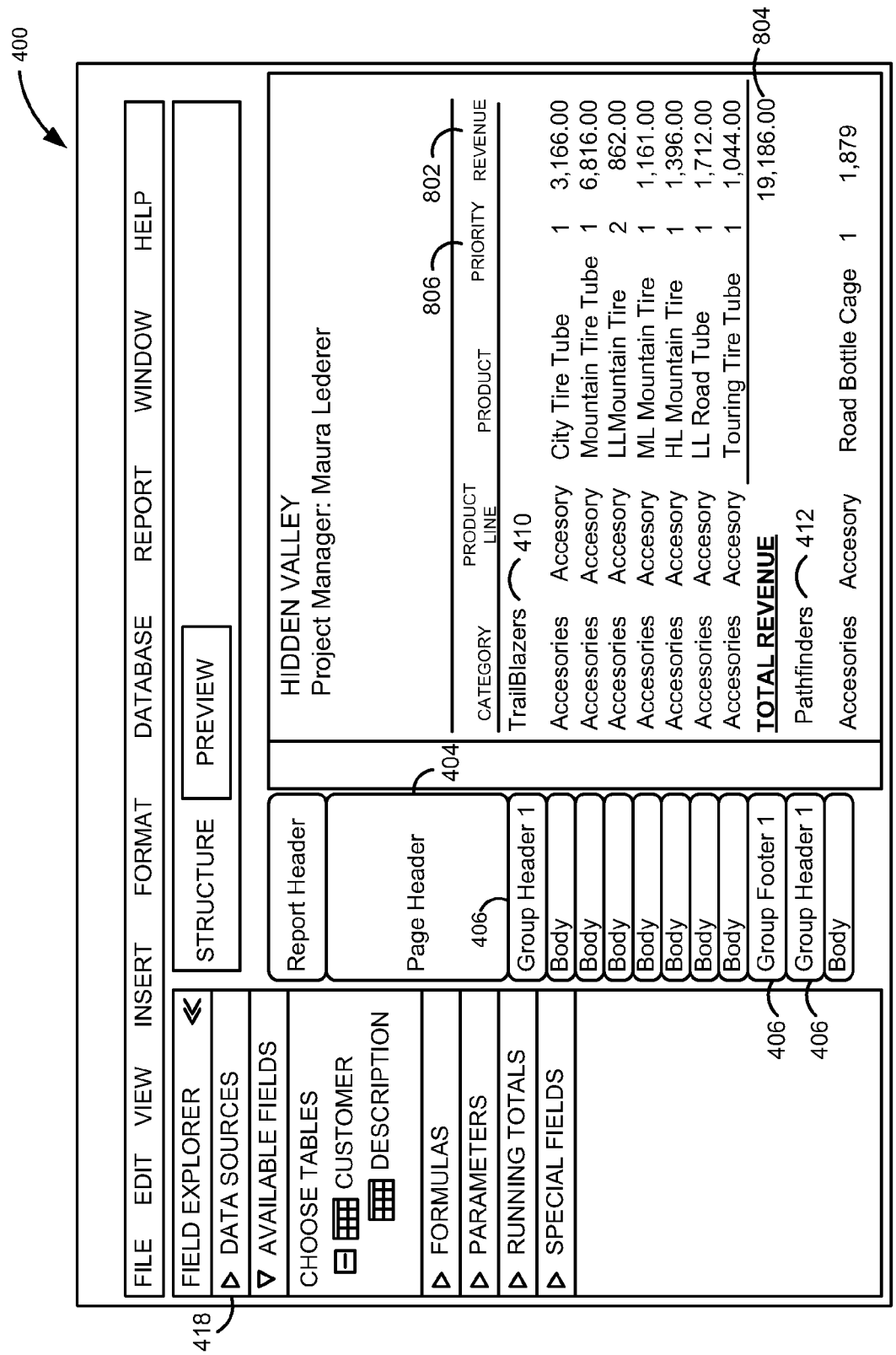
FIG. 8 illustrates the report of FIG. 4 in which an attribute of an area of the report is changed, according to an embodiment.

FIG. 8 illustrates the report of FIG. 4 in which an attribute of an area of the report 400 is changed, according to an embodiment. As discussed above, the report 400 has a grouping on "Product Category" (e.g., TrailBlazers 410, Pathfinders 412). The group header 1 (group header/footer pair area 406) of the report 400 has a report object "Revenue" 802 (the name of the report object "Revenue" would appear in the page header (page header/footer pair area 404)). The metadata of the report object "Revenue" 802 provides information that the report object "Revenue" 802 is a delegated aggregate.

In one embodiment, a delegated aggregate is defined as an aggregate that is deferred back to the data source for calculation. The context of the aggregation is provided to the data source and is retrieved. The value of the delegated aggregate (Total Revenue) 804 for each product category (which is the context for the delegated aggregate "Revenue") "TrailBlazers" 410 and "Pathfinders" 412 is retrieved from the data source 418 and placed in the Group Footer 1 (group header/footer pair area 406) of the corresponding product category. FIG. 8 illustrates the delegated aggregate "Revenue" value 804 only for the product category "TrailBlazers" 410 a similar delegated aggregate "Revenue" value would be present for the product category "Pathfinders" 412.

An input is received to change the attribute of the group header/footer pair area 406 (bloc 302, FIG. 3). In one embodiment, the input is received from a user. The group header 1 (group header/footer pair area 406) is modified to be based on a reporting formula named "priority" 806 (as shown the name of the report object "priority" 806 would appear in the page header (page header/footer pair area 404)). The "priority" 806 formula states that "if the revenue is above 1000 assign a high priority (1) and if the revenue is below 1000 assign a low priority (2)".

As shown in FIG. 8, the products (City Tire Tube, Mountain Tire Tube, ML Mountain Tire, HL Mountain Tire, LL Road Tire, Touring Tire Tube, and Road Bottle Cage) that have the sales value above 1000 are assigned a high priority (1) and the product (LL Mountain Tire) that has the revenue value below 1000 are assigned a low priority (2).

Figure 9:
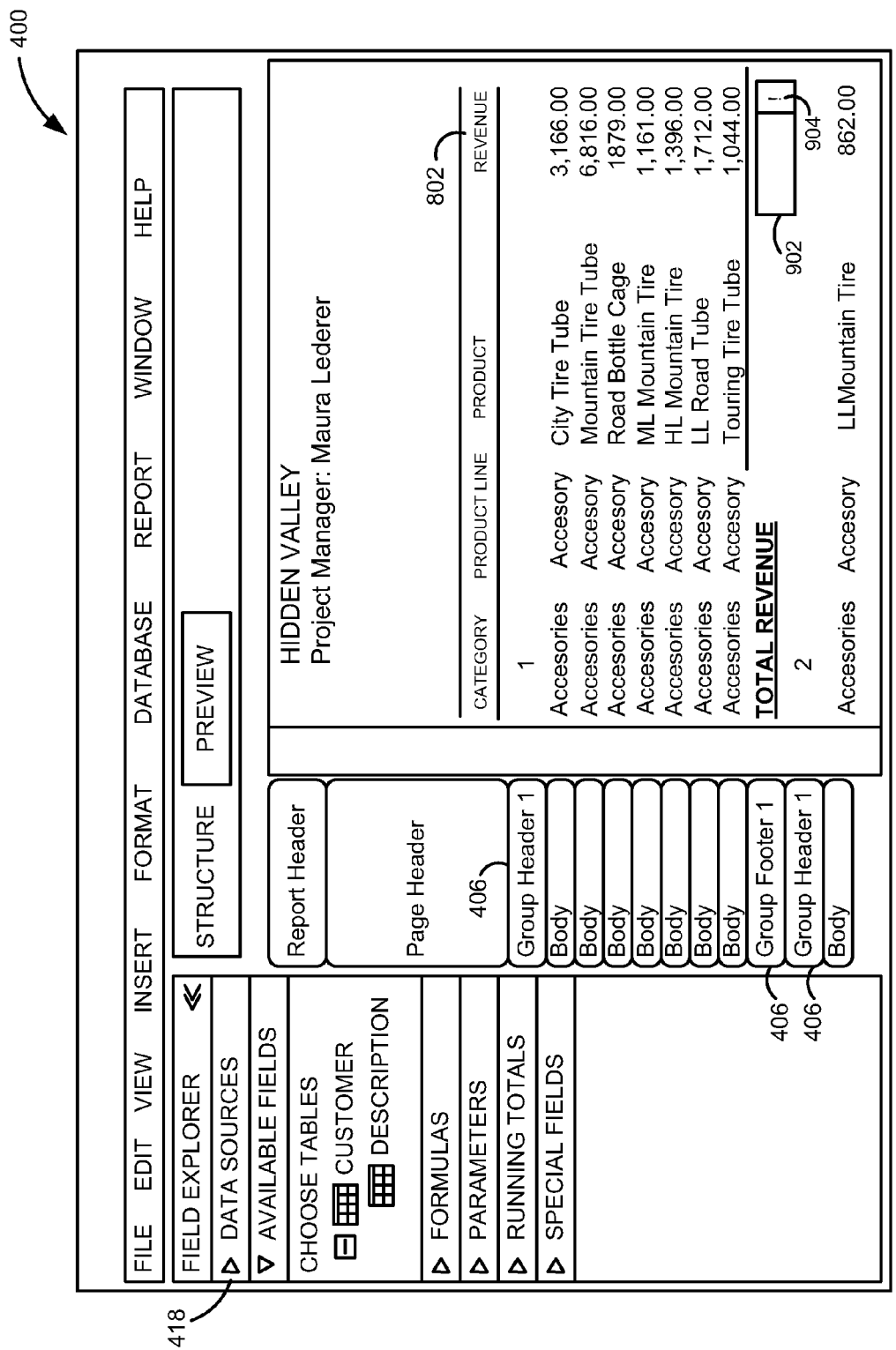
FIG. 9 illustrates the report of FIG. 4 that is grouped based on a reporting formula "priority", according to an embodiment.

Next, the report 400 is re-grouped based on the reporting formula "priority" 806. FIG. 9 illustrates the report 400 of FIG. 4 that is grouped based on the reporting formula "priority" 806, according to an embodiment. As the group header 1 is modified to be based on the reporting formula "priority" 806, the groups are regrouped based on the priority (1 and 2). As shown, all the products that have the high priority (1) are placed in a first group (that is based on the high priority (1)) and all the products that have the low priority (2) are placed in a second group (based on the low priority (2)).

As the object on which the report 400 is grouped is changed (from "product category" to "priority" 806), the attribute of the group header/footer pair area 406 that includes this information (i.e., the information about the object on which the report is grouped) is also changed.

Next the metadata of the report object "Revenue" 802 placed in the group header/footer pair area 406 is retrieved (block 304, FIG. 3). The metadata of the report object "Revenue" 802 provides information that it is a delegated aggregate for a grouping context "product category".

Next a mismatch is identified between the group header/footer pair area 406 and the report object 802 "Revenue" present in the group header/footer pair area 406 (block 306, FIG. 3). The mismatch is identified based on the changed attribute of the group header/footer pair area 406 and the metadata of the report object "Revenue" 802. The changed attribute for the group/header footer pair area 406 provides information that the report 400 is based on grouping over "priority" 806. As discussed above, the metadata of the report object 802 "Revenue" provides information that it is a delegated aggregate for a grouping context "product category". The mismatch is identified, as the changed attribute (grouping over "Priority" 806) of the group header/footer pair area 406 does not match with the metadata of the report object "Revenue" 802 (delegated aggregate for a grouping context "product category").

In one embodiment, the set of heuristics are used for identifying the mismatch. The set of heuristics for this embodiment would be: (Identified Mismatch): The value for the delegated aggregate cannot be calculated for this group. (Context): The error has occurred as a delegated aggregate is inserted into a group context where the measure cannot be resolved (formula, another measure, data custom grouping). (Reason): The reason for this error is that the report contains features that cannot be understood by the data source.

Due to this mismatch, the value of the delegated aggregate "Revenue" 804 that is based on the grouping context "product category" cannot be retrieved as the report 400 is now grouped on a reporting formula 806 "Priority." When the delegated aggregate "Revenue" value 804 is being retrieved for the group based on the priority (i.e., for priority 1 and 2), the data source 418 is queried to obtain the revenue value 804 for each group (the first group and the second group) based on the priority. However, as the data source 418 is unaware of the context (priority) the delegated aggregate "Revenue" value 804 present in the group footer (group header/footer area 406) cannot be retrieved.

Finally, the identified mismatch between the report object 802 "Revenue" and the group header/footer pair area 406 is displayed (block 308, FIG. 3). As shown, the delegated aggregate "Revenue" value 804 that cannot be retrieved is highlighted with a border 902 and an exclamation mark 904 on the highlight.

Figure 10:
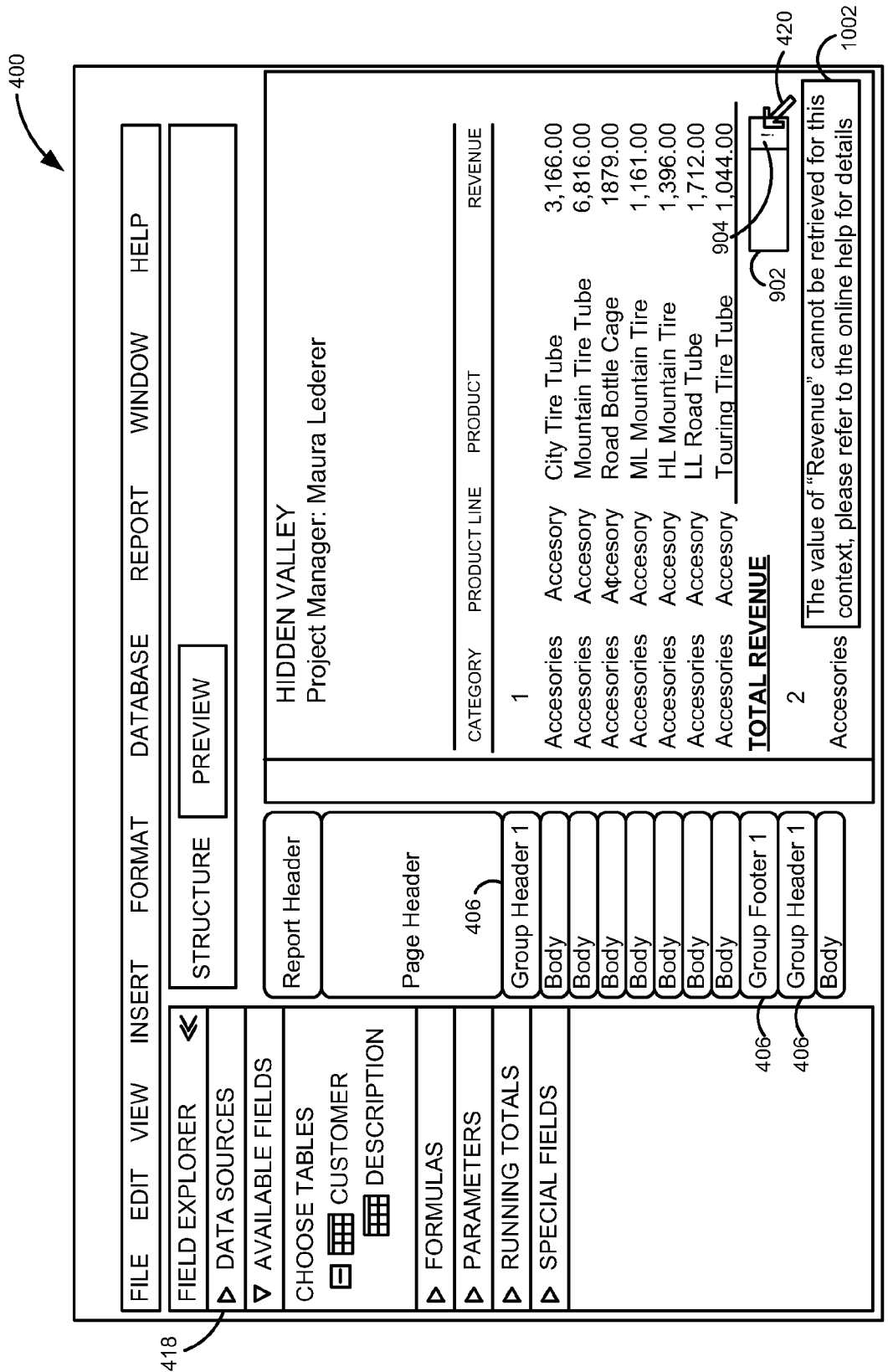
FIG. 10 illustrates the report of FIG. 9 displaying the identified mismatch, according to an embodiment.

FIG. 10 illustrates the report of FIG. 9 when the cursor 420 is positioned on the exclamation mark 904, according to an embodiment. As shown, when the cursor 420 is positioned on the exclamation mark 904 a tooltip 1002 is placed adjacent the cursor. The identified mismatch is displayed in the tooltip 1002. In one embodiment, the identified mismatch is displayed to a user. In one embodiment, the identified mismatch is displayed on a user interface. The identified mismatch displayed is "The value of "Revenue" cannot be retrieved for this context, please refer to the online help for details."

Figure 11:
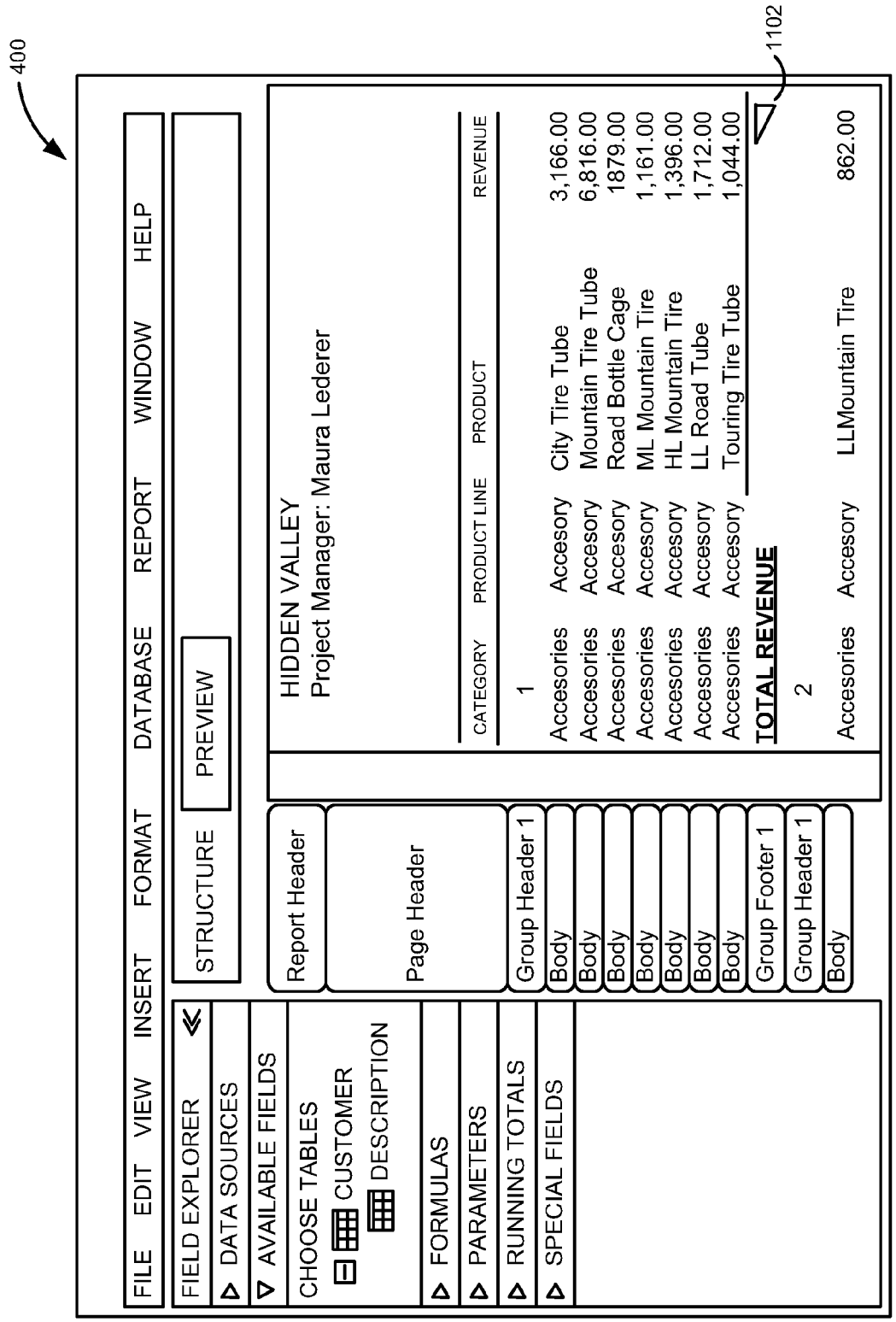
FIG. 11 illustrates the report of FIG. 10 when the tooltip displayed in FIG. 10 is ignored, according to an embodiment.

FIG. 11 illustrates the report of FIG. 10 when the tooltip 1002 displayed in FIG. 10 is ignored, according to an embodiment. In case the user ignores the tooltip 1002 and continues working (for example completing another modification operation), then as shown in FIG. 11 the border 902 of FIG. 9 is replaced with an earmark 1102 indicative of the mismatch.

Figure 12:
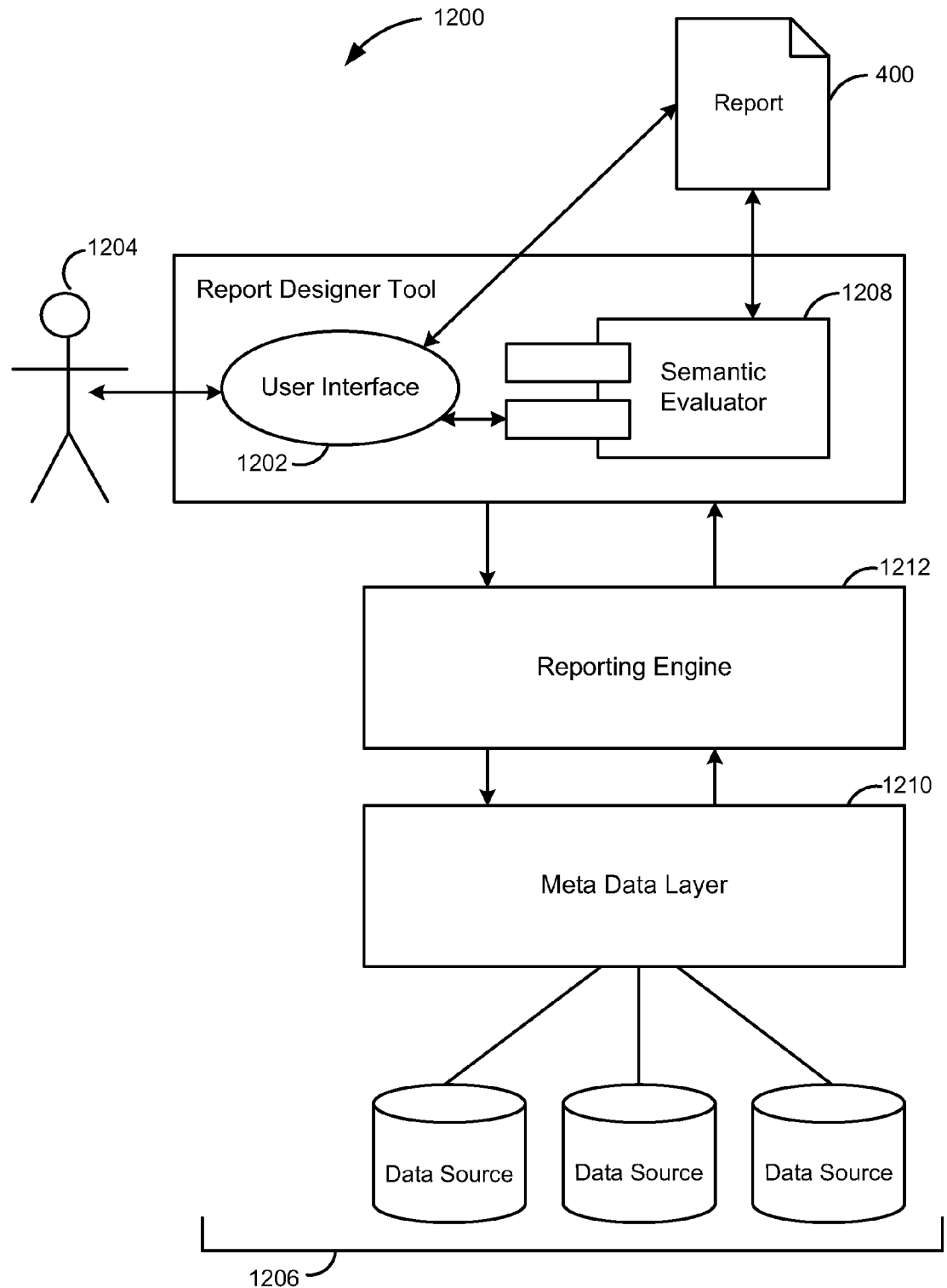
FIG. 12 illustrates a system for providing semantic guidance in the report of FIG. 4, according to an embodiment.

FIG. 12 illustrates a system 1200 for providing semantic guidance in the report 400 of FIG. 4, according to an embodiment. The system 1200 includes a user interface 1202 that displays the report 400. In one embodiment, the report 400 is displayed to a user 1204. The user 1204 can position and place (by a drag-and-drop operation) a report object at the location on the report 400 via the user interface 1202. The user 1204 can also change the attribute of the area of the report 400 via the user interface 1202. In one embodiment, the report object may be dragged directly from the data source 1206 and placed at the location on the report 400.

The system 1200 includes a semantic evaluator 1208 that identifies the mismatch between the report object and the area associated with the report object. The semantic evaluator 1208 retrieves a report model of the report 400. The report model includes the attribute related to the one or more areas of the report 400. The user interface 1202 provides the contextual information related to the report object to the semantic evaluator 1208. The contextual information provides information of the location on the report 400 where the report object is positioned. The location on the report 400 is associated with the area of the report. The semantic evaluator 1208 identifies the attribute related to the area from the report model, i.e., from the attribute of the one or more report objects included in the report model.

The semantic evaluator 1208 retrieves the metadata of the report object from a metadata layer 1210 associated with the data source 1206. The metadata of the report object is retrieved by the semantic evaluator 1208 through a reporting engine 1212. Using this metadata of the report object and the attribute of the area on which the report object is positioned, the semantic evaluator 1208 identifies whether a mismatch has occurred between the report object and the area on which the report object is positioned. In one embodiment, the semantic evaluator 1208 uses the set of heuristics programmed into it for identifying the mismatch. The identified mismatch is finally provided to the user interface 1202 which then displays the identified mismatch to the user. In one embodiment, the metadata of the layer 1210 is contained in the data source 1206. In one embodiment, the metadata is calculated at runtime during the report creation.

In case the attribute of the area is changed, the semantic evaluator 1208 identifies the mismatch between the area whose attributes are changed and the report object placed in the area by comparing the changed attribute with the metadata of the report object placed in the area.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 13:
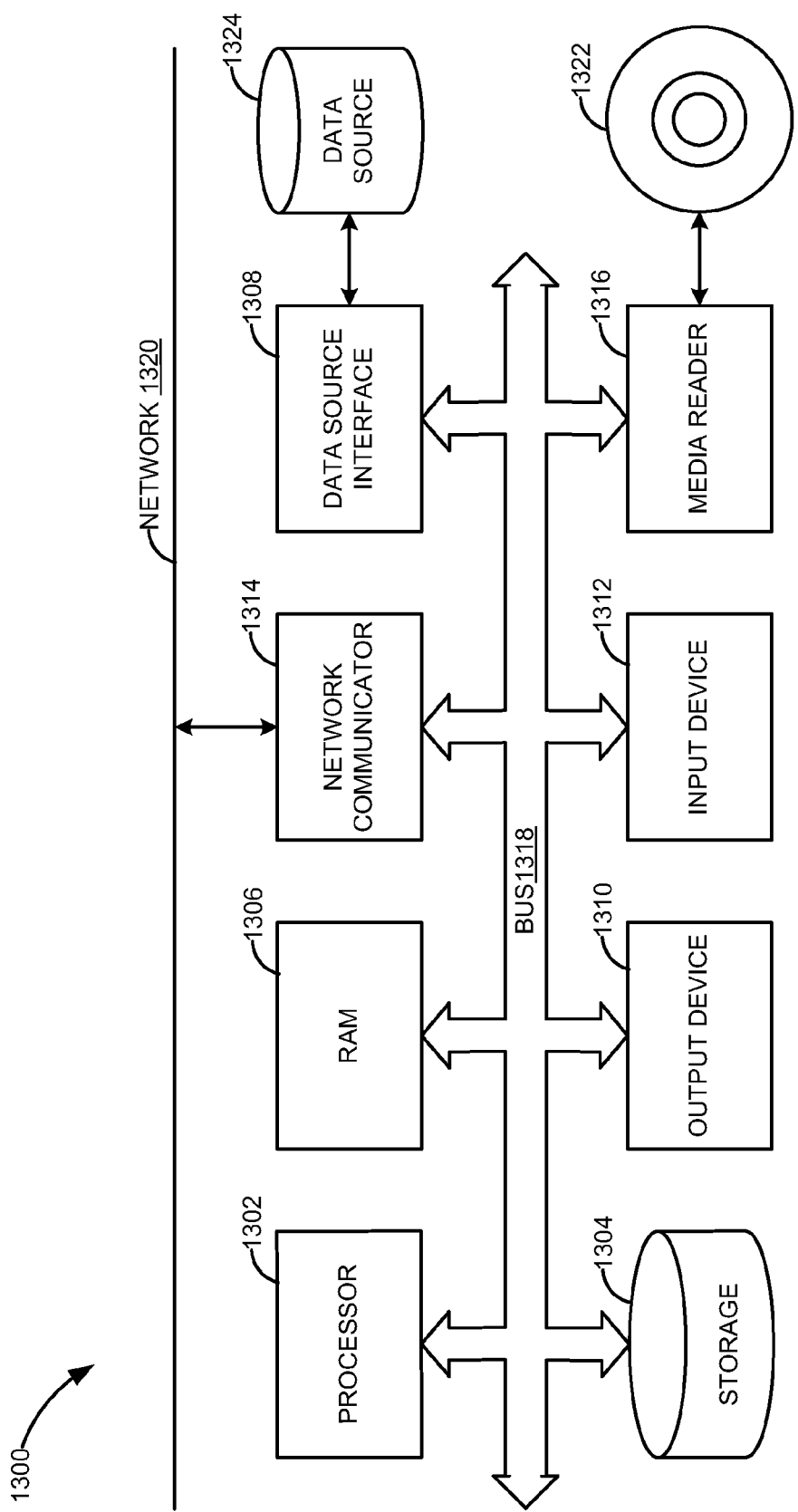
FIG. 13 is a block diagram illustrating a computing environment in which the techniques described for providing the semantic guidance can be implemented, according to an embodiment.

FIG. 13 is a block diagram of an exemplary computer system 1300. The computer system 1300 includes a processor 1302 that executes software instructions or code stored on a computer readable storage medium 1322 to perform the above-illustrated methods of the invention. The computer system 1300 includes a media reader 1316 to read the instructions from the computer readable storage medium 1322 and store the instructions in storage 1304 or in random access memory (RAM) 1306. The storage 1304 provides a large space for keeping static data where at least some instructions could be stored for later execution. The stored instructions may be further compiled to generate other representations of the instructions and dynamically stored in the RAM 1306. The processor 1302 reads instructions from the RAM 1306 and performs actions as instructed. According to one embodiment of the invention, the computer system 1300 further includes an output device 1310 (e.g., a display) to provide at least some of the results of the execution as output including, but not limited to, visual information to users and an input device 1312 to provide a user or another device with means for entering data and/or otherwise interact with the computer system 1300. Each of these output devices 1310 and input devices 1312 could be joined by one or more additional peripherals to further expand the capabilities of the computer system 1300. A network communicator 1314 may be provided to connect the computer system 1300 to a network 1320 and in turn to other devices connected to the network 1320 including other clients, servers, data stores, and interfaces, for instance. The modules of the computer system 1300 are interconnected via a bus 1318. Computer system 1300 includes a data source interface 1308 to access data source 1324. The data source 1324 can be accessed via one or more abstraction layers implemented in hardware or software. For example, the data source 1324 may be accessed by network 1320. In some embodiments the data source 1324 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method for providing a semantic guidance in a report, the method comprising:
   retrieving, by a processor of a computer, a report model of the report, wherein the report model includes an attribute related to an area of the report;
   receiving contextual information associated with a report object, wherein the contextual information includes information of a location on the report where the report object is positioned, wherein the location on the report is associated with the area of the report;
   retrieving, by the processor of the computer, a metadata of the report object positioned at the location of the report including a plurality of areas, the plurality of areas including a detailed area and a report pair area, the report pair area including two areas of the report, the detailed area and the report pair area of the report having a corresponding attribute, wherein the two areas of the report pair area have the same corresponding attribute;
   identifying, by the processor of the computer, the attribute related to the area of the report from the report model;
   matching, by the processor of the computer, the metadata of the report object and the attribute of the area of the report that includes the location on which the report object is positioned, the attribute including one or more area properties that define conditions to determine semantic correctness of placement of the report object with respect to the area of the report, wherein matching includes:
      matching the one or more area properties with the metadata of the report object; and
      based on the matching, identifying, using a set of heuristics, a mismatch between the report object and the area of the report on which the report object is positioned.

2. The computer implemented method according to claim 1, further comprising displaying the mismatch between the report object and the area of the report with which the location is associated.

3. The computer implemented method according to claim 2, wherein the mismatch is displayed in a tooltip.

4. The computer implemented method according to claim 1, further comprising:
   receiving a request to place the report object at the location where the report object is positioned;
   marking the report object placed in the area, wherein the mark is indicative of the mismatch; and
   displaying the mismatch when a cursor is positioned on the report object.

5. The computer implemented method according to claim 4, wherein the report object is positioned and placed at the location on the report by a drag-and-drop operation.

6. The computer implemented method according to claim 1, further comprising:
   receiving an input to change the attribute of the area; and
   identifying the mismatch between the report object positioned in the area and the changed attribute of the area.

7. The computer implemented method according to claim 6, further comprising: displaying the mismatch.

8. The computer implemented method according to claim 1, wherein the report pair area includes one or more paired areas selected from a group consisting of a report header and footer, a page header and footer, and a group header and footer.

9. The computer implemented method according to claim 1, wherein using the set of heuristics includes identifying the mismatch when the report object having multiple values is positioned on one of: a group header area and a group footer area.

10. An article of manufacture including a computer readable storage memory to tangibly store instructions, which when executed by a computer, cause the computer to:
   retrieve a report model of a report, wherein the report model includes an attribute related to an area of the report;
   receive contextual information associated with a report object, wherein the contextual information includes information of a location on the report where the report object is positioned, wherein the location on the report is associated with the area of the report;
   retrieve a metadata of the report object positioned at the location of the report including a plurality of areas, the plurality of areas including a detailed area and a report pair area, the report pair area including two areas of the report, the detailed area and the report pair area of the report having a corresponding attribute, wherein the two areas of the report pair area have the same corresponding attribute;
   identify the attribute related to the area of the report from the report model;
   match the metadata of the report object and the attribute of the area of the report that includes the location on which the report object is positioned, the attribute including one or more area properties that define conditions to determine semantic correctness of placement of the report object with respect to the area of the report, wherein matching includes:
      match the one or more area properties with the metadata of the report object; and
      based on the matching, identify, using a set of heuristics, a mismatch between the report object and the area of the report on which the report object is positioned.

11. The article of manufacture according to claim 10, further comprising instructions which when executed by the computer further causes the computer to: display the mismatch between the report object and the area with which the location is associated.

12. The article of manufacture according to claim 11, wherein the mismatch is displayed in a tooltip.

13. The article of manufacture according to claim 10, further comprising instructions which when executed by the computer further causes the computer to:
   receive a request to place the report object at the location where the report object is positioned;
   mark the report object placed in the area, wherein the mark is indicative of the mismatch; and
   display the mismatch when a cursor is positioned on the report object.

14. The article of manufacture according to claim 13, wherein the report object is positioned and placed at the location on the report by a drag-and-drop operation.

15. The article of manufacture according to claim 10, further comprising instructions which when executed by the computer further causes the computer to:
receive an input to change the attribute of the area; and
identify the mismatch between the report object positioned in the area of the report and the changed attribute of the area of the report.

16. The article of manufacture according to claim 15 further comprising instructions which when executed by the computer further causes the computer to:
display the mismatch.

17. A computer system for providing a semantic guidance in a report, the computer system comprising:
a memory to store a program code; and
a processor communicatively coupled to the memory, the processor configured to execute the program code to:
retrieve a report model of a report, wherein the report model includes an attribute related to an area of the report;
receive contextual information associated with a report object, wherein the contextual information includes information of a location on the report where the report object is positioned, wherein the location on the report is associated with the area of the report;
identify the attribute related to the area of the report from the report model;
retrieve a metadata of the report object positioned at the location of the report including a plurality of areas, the plurality of areas including a detailed area and a report pair area, the report pair area including two areas of the report, the detailed area and the report pair area of the report having a corresponding attribute, wherein the two areas of the report pair area have the same corresponding attribute;
match the metadata of the report object and the attribute of the area of the report that includes the location on which the report object is positioned, the attribute including one or more area properties that define conditions to determine semantic correctness of placement of the report object with respect to the area of the report, wherein matching includes:
match the one or more area properties with the metadata of the report object; and
based on the matching, identify, using a set of heuristics, a mismatch between the report object and the area of the report on which the report object is positioned.

18. The system of claim 17, wherein the processor further executes the program code to:
display the mismatch between the report object and the area of the report with which the location is associated.

19. The system of claim 18, wherein the mismatch is displayed in a tooltip.

20. The system of claim 18, wherein the processor further executes the program code to:
receive a request to place the report object at the location where the report object is positioned;
mark the report object placed in the area, wherein the mark is indicative of the mismatch; and
display the mismatch when a cursor is positioned on the report object.

21. The system of claim 20, wherein the report object is positioned and placed at the location on the report by a drag-and-drop operation.

22. The system of claim 17, wherein the processor further executes the program code to:
receive an input to change the attribute of the area; and
identify the mismatch between the report object positioned in the area of the report and the changed attribute of the area of the report.

23. The system of claim 22, wherein the processor further executes the program code to:
display the mismatch.

\* \* \* \* \*